United States Patent [19]
Berberich et al.

[11] Patent Number: 6,097,608
[45] Date of Patent: Aug. 1, 2000

[54] DISK DRIVE VIBRATION ISOLATION USING DIAPHRAGM ISOLATORS

[75] Inventors: James William Berberich; Steven A. Hanssen, both of San Jose, Calif.

[73] Assignee: International Business Machines Corporation, Armonk, N.Y.

[21] Appl. No.: 09/192,873

[22] Filed: Nov. 16, 1998

[51] Int. Cl.[7] .............................. G06F 1/16; H05K 5/00; H05K 7/12
[52] U.S. Cl. .......................... 361/752; 361/753; 361/759; 361/801; 361/825; 361/685; 248/560; 312/223.1; 369/75.1
[58] Field of Search .................................... 361/685, 686, 361/728, 730, 736, 752, 753, 759, 796, 801–802, 825; 211/41.17; 248/560–562; 206/706; 312/223.1, 223–223.4; 369/75.1

[56] References Cited

U.S. PATENT DOCUMENTS

| | | | |
|---|---|---|---|
| 4,937,806 | 6/1990 | Babson et al. | 369/75.1 |
| 5,066,708 | 11/1991 | Koller, Sr. et al. | 524/504 |
| 5,335,893 | 8/1994 | Opp | 248/635 |
| 5,349,486 | 9/1994 | Sugimoto et al. | 360/97.01 |
| 5,673,158 | 9/1997 | Ichimura | 360/97.01 |
| 5,682,291 | 10/1997 | Jeffries et al. | 361/685 |
| 5,703,734 | 12/1997 | Berberich et al. | 360/97.02 |
| 5,751,551 | 5/1998 | Hileman et al. | 361/753 |
| 5,777,845 | 7/1998 | Krum et al. | 361/685 |

*Primary Examiner*—Jayprakash N. Gandhi
*Attorney, Agent, or Firm*—Noreen A. Krall; William D. Gill

[57] ABSTRACT

A diaphragm isolator frame for supporting a disk drive in a rack or other enclosure while providing isolation from undesirable vibrations from other disk drives or components mounted in the enclosure or from the environment. The diaphragm isolator frame comprises a pair of side rails having isolators formed of thinned portions of the side rails to form diaphragms, each diaphragm having a centrally located press-pin for supporting the disk drive. The thickness and diameter of the diaphragms may be chosen to provide vibration isolation at a desired frequency.

13 Claims, 7 Drawing Sheets

SECTION A-A'

DISK DRIVE VIBRATION ISOLATION USING DIAPHRAGM ISOLATORS

BACKGROUND OF THE INVENTION

1. Field of the Invention

This invention relates in general to disk drives, and in particular to a diaphragm isolator frame for a disk drive and method of using the same to support the disk drive while providing vibration isolation.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus, the suspension provides desired slider loading and dimensional stability between the slider and an actuator arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

One or more electrical conductors extend over the suspension assembly to electrically connect the read/write transducer to a read/write chip on the actuator arm. A multiline flexible printed circuit cable (actuator flex cable) provides the electrical contact between the read/write chip and the disk drive electronics which are mounted outside the disk drive housing. Inside the disk drive housing, the actuator flex cable connects to an electrical connector pin assembly, which in turn, through an opening or connector port in the housing, connects to the external electronics.

Disk drives, which are used as a storage means for a computer system, are typically mounted in suitable containers or racks either singularly or in arrays comprising a plurality of disk drives. Disk drives mounted in this way may experience data recording and access failures due to operational vibration of the disk drive or due to induced vibration from adjacent disk drives or other equipment mounted in the same container or rack. Isolation of the disk drive to reduce unwanted vibrations which may degrade performance and reliability is a important consideration in the installation and mounting of disk drives.

In the prior art, isolation of the disk drives by the use of rubber grommets is common practice. One such example is found in U.S. Pat. No. 5,335,893 issued to Opp. However, the grommet mounts consume a relatively large volume of space and comprise hard to assemble components not suited to automation and high volume production. Also, because rubber is used as the vibration dampening material, this isolation method is subject to variation in dampening characteristics with changes in temperature and mechanical tolerances.

It therefore can be seen that there is a need for an apparatus and a method for isolating the disk drive from unwanted vibrations when mounted in a container or rack that is compact, has few parts, and is suitable for volume production by automated assembly methods. Further, there is a need for vibration isolation means with optimized and controlled vibration dampening characteristics which is not subject to variations in damping characteristics with changes in temperatures or tolerances.

SUMMARY OF THE INVENTION

It is an object of the present invention to disclose an apparatus and method of isolating a disk drive mounted in a container or rack from unwanted vibrations.

It is another object of the present invention to disclose a diaphragm isolator frame for mounting a disk drive in a container or rack so as to isolate the disk drive from unwanted vibrations.

It is a yet another object of the present invention to disclose a diaphragm isolator frame for mounting a disk drive in a container or rack wherein the system natural isolation frequency is controlled by the thickness of the isolator diaphragm.

It is a further object of the present invention to disclose a method of supporting and mounting a disk drive in a container or rack to provide vibration isolation for the disk drive.

In accordance with the principles of the present invention, there is disclosed a diaphragm isolator frame comprising a circuit board card disposed between two side rails fixed to the side edges of the circuit board card to form a supporting frame for a disk drive. Each side rail is a substantially rectangular bar, preferably made of polycarbonate by an injection molding process, comprising a circular diaphragm portion of thinned material near each end. Press-pins centrally located on each circular diaphragm and extending perpendicular to the side rail surfaces provide supporting mounts for the disk drive. The thickness of the circular diaphragms is chosen to provide optimum vibration isolation of the disk drive from the container or rack in which the diaphragm isolator frame is mounted. Electrical connections between the disk drive and the circuit board card are provided by a folded flat ribbon connector cable to further ensure vibration isolation of the disk drive from the container or rack.

A method of supporting and mounting a disk drive is disclosed wherein all of the supporting diaphragm isolators are equidistant from the center of gravity of the disk drive ensuring that each isolator supports an equal fraction of the weight of the disk drive. When each isolator is equally loaded, optimum vibration isolation can be obtained using a single uniform design for all the isolators in the diaphragm isolator frame.

One advantage achieved by the present invention is that the diaphragm isolator is easily manufacturable in volume as it has fewer parts. An additional advantage of the present invention is that an isolation method is provided for a disk drive in a rack system that is not subject to variations in damping characteristics with changes in operating temperatures of the disk drives or variations in mechanical tolerances of manufacturing.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
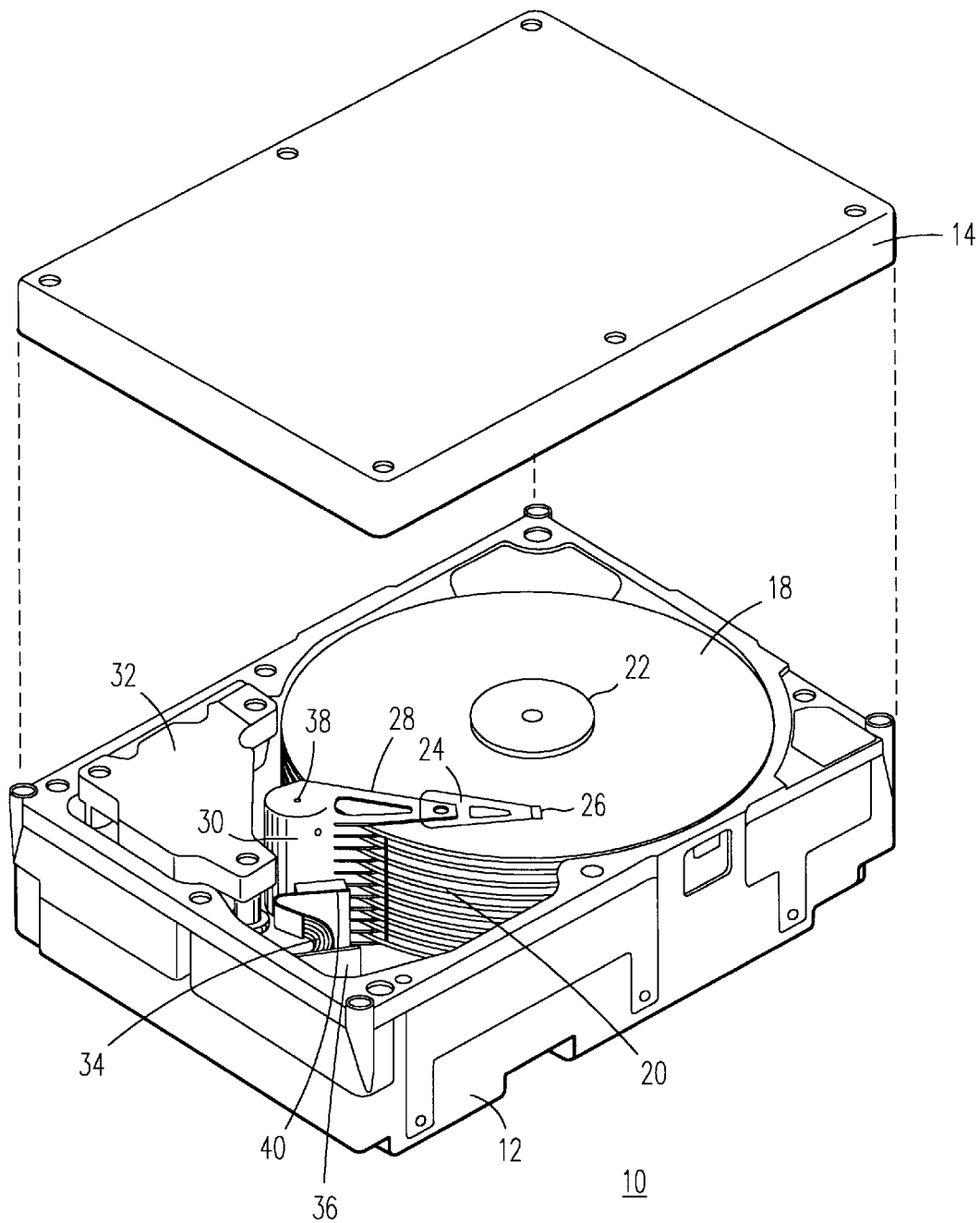
FIG. 1 is an isometric view of the disk drive of the present invention with the top cover exploded to illustrate the relative placement of the components.

FIG. 1 shows a disk drive system designated by the general reference number 10. The lid 14 of the disk drive is shown exploded. In operation, the lid would be disposed on top of the housing 12.

The disk drive comprises one or more magnetic disks 18. The disks 18 may be conventional particulate or thin film recording disks, which are capable of storing digital data in concentric tracks. In a preferred embodiment, both sides of the disks 18 are available for storage, and it will be recognized by one of ordinary skill in the art that the disk drive 10 may include any number of such disks 18.

The disks 18 are mounted to a spindle 22. The spindle 22 is attached to a spindle motor (not shown) which rotates the spindle 22 and the disks 18 to provide read/write access to the various portions of the concentric tracks on the disks 18.

An actuator assembly 30 includes a positioner arm 28, and a suspension assembly 24. The suspension assembly 24 includes a slider/transducer assembly 26 at its distal end. Although only one slider/transducer assembly 26 of the suspension assembly 24 is shown, it will be recognized that the disk drive 10 has one slider/transducer assembly 26 for each side of each disk 18 included in the drive 10. The positioner arm 28 further comprises a pivot 38 around which the positioner arm 28 pivots.

The disk drive 10 further includes an amplifier chip 40. As is well known in the art, the amplifier chip 40 cooperates with the slider/transducer assembly on the slider assembly 26 to read data from or write data to the disks 18. A flexible printed circuit member or actuator flex cable 34 carries signals between the amplifier chip 40 and a connector pin assembly (not shown) which interfaces with the external signal processing electronics. The actuator flex cable 34 leading from the amplifier chip 40 is attached to an arm electronics (AE) bracket 36 which directs the actuator flex cable 34 to a connector port for connection to the connector pin assembly.

The main function of the actuator assembly 30 is to move the positioner or actuator arm 28 around the pivot 38. Part of the actuator assembly 30 is the voice coil motor (vcm) assembly 32 which comprises a vcm bottom plate, a magnet and a vcm top plate in combination with an actuator coil. Current passing through the actuator coil interacts with the magnetic field of the magnet to rotate the positioner arm 28 and suspension assembly 24 around the pivot 38, thus positioning the transducer/suspension assembly as desired.

Figure 2:
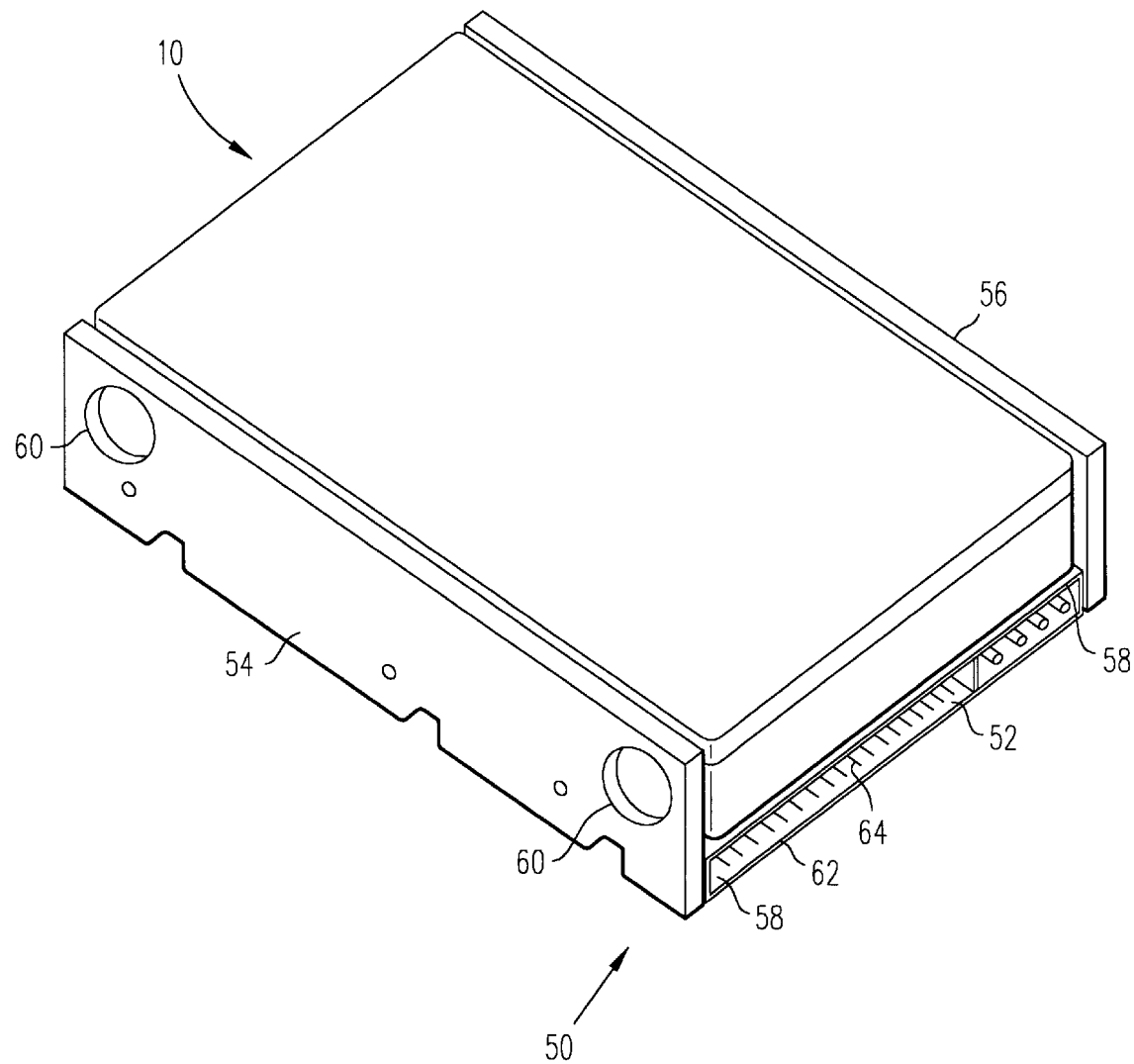
FIG. 2 is an isometric view of the disk drive mounted in the diaphragm isolator frame of the present invention.

FIG. 2 shows an isometric view of the diaphragm isolator frame 50 supporting a disk drive 10 according to the preferred embodiment of the present invention. The diaphragm isolator frame 50 comprises a circuit board card 52 disposed between side rails 54 and 56 fixed to side edges 58 of the circuit board card 52. The disk drive 10 is supported by two isolators 60 on the side rail 54 and by two isolators (not shown) on the side rail 56 without contacting the circuit board card 52. The isolators 60 are designed to support the disk drive 10 while providing isolation of the disk drive 10 from undesirable vibrations, from sources such as the spindle motor in other disk drives mounted in the same disk drive enclosure or rack. The view of FIG. 2 shows the back edge 62 of the circuit board card 52 further illustrating the frame electrical connector 64 providing electrical contacts to the circuit board card 52 for interfacing with the external signal processing electronics.

Figure 3:
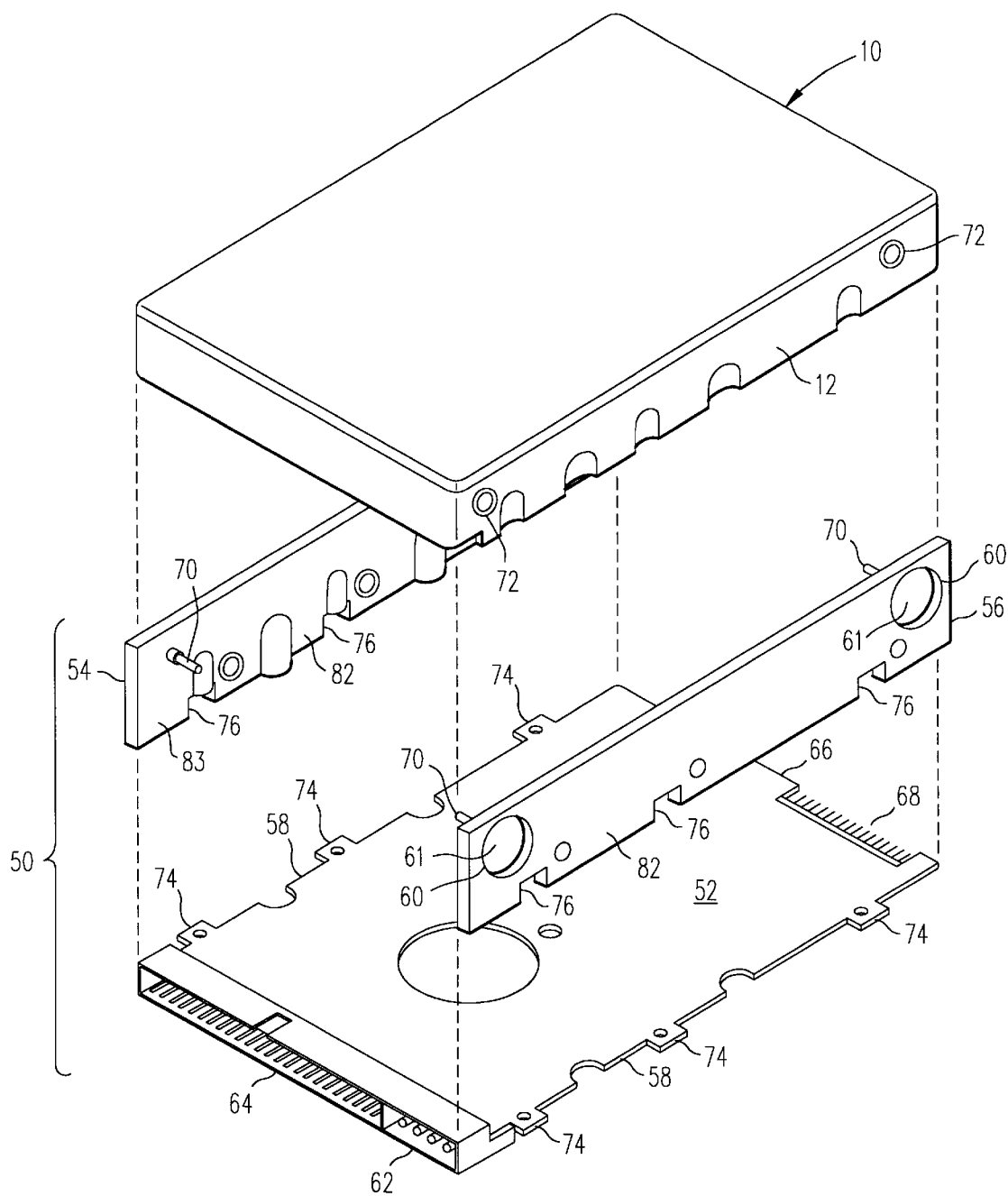
FIG. 3 is an isometric view of the diaphragm isolator frame of the present invention and the disk drive with the parts exploded.

FIG. 3 is an isometric view of the diaphragm isolator frame 50 and the disk drive 10 with the parts exploded. The circuit board card 52 has an essentially rectangular shape with two side edges 58, a back edge 62 and a front edge 66.

The frame electrical connector 64 fixed to the back edge 62 of the circuit board card 52 provides electrical contacts for interfacing with the signal processing electronics. A disk drive electrical connector 68 fixed to the front edge 66 of the circuit board card 52 provides electrical contacts from the circuit board card electronics (not shown) to the disk drive 10 via a flat ribbon connector cable (not shown). The flat ribbon connector cable may be folded back to form a flexible electrical connection with the disk file 10.

One or more tabs 74 formed on the side edges 58 of circuit board card 52 fit into a corresponding number of slots 76 formed on the bottom edges 82 of the side rails 52 and 56. The circuit board card 52 may be fixed to the side rails 54 and 56 by means of screws (not shown) through holes in the tabs 74 into mating threaded holes at the bottoms of the slots 76.

Side rails 54 and 56 are formed with isolators 60 at each end of the rail. Each isolator 60 comprises a thinned portion or diaphragm 61 of the side rail 54, 56, preferably having a circular shape, with a press-pin 70 formed on the inside surface 83 at the center of the diaphragm 61 and extending perpendicular to the inside surface 83 of the side rail 54, 56. The press-pin 70 portions of the isolators 60 provide support mounts for the disk drive 10 while the diaphragms 61 provide vibration isolation for the mounted disk drive 10. The disk drive 10 is installed in the diaphragm isolator frame 50 by inserting the press-pins 70 into receiving holes 72 provided in the housing 12 of disk drive 10.

Figure 4:
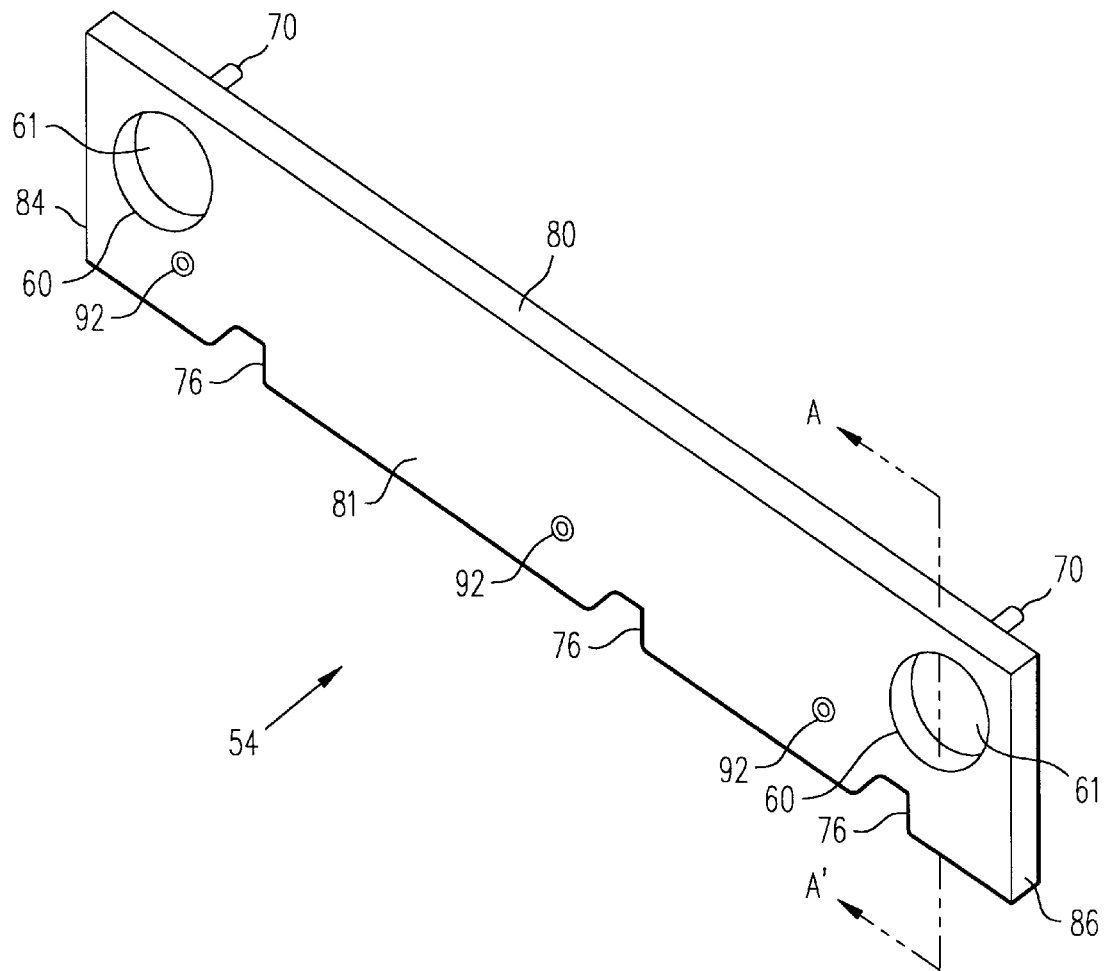
FIG. 4 is an isometric view of a side rail of the diaphragm isolator frame of the present invention showing the outside surface and top edge of the side rail.
Figure 5:
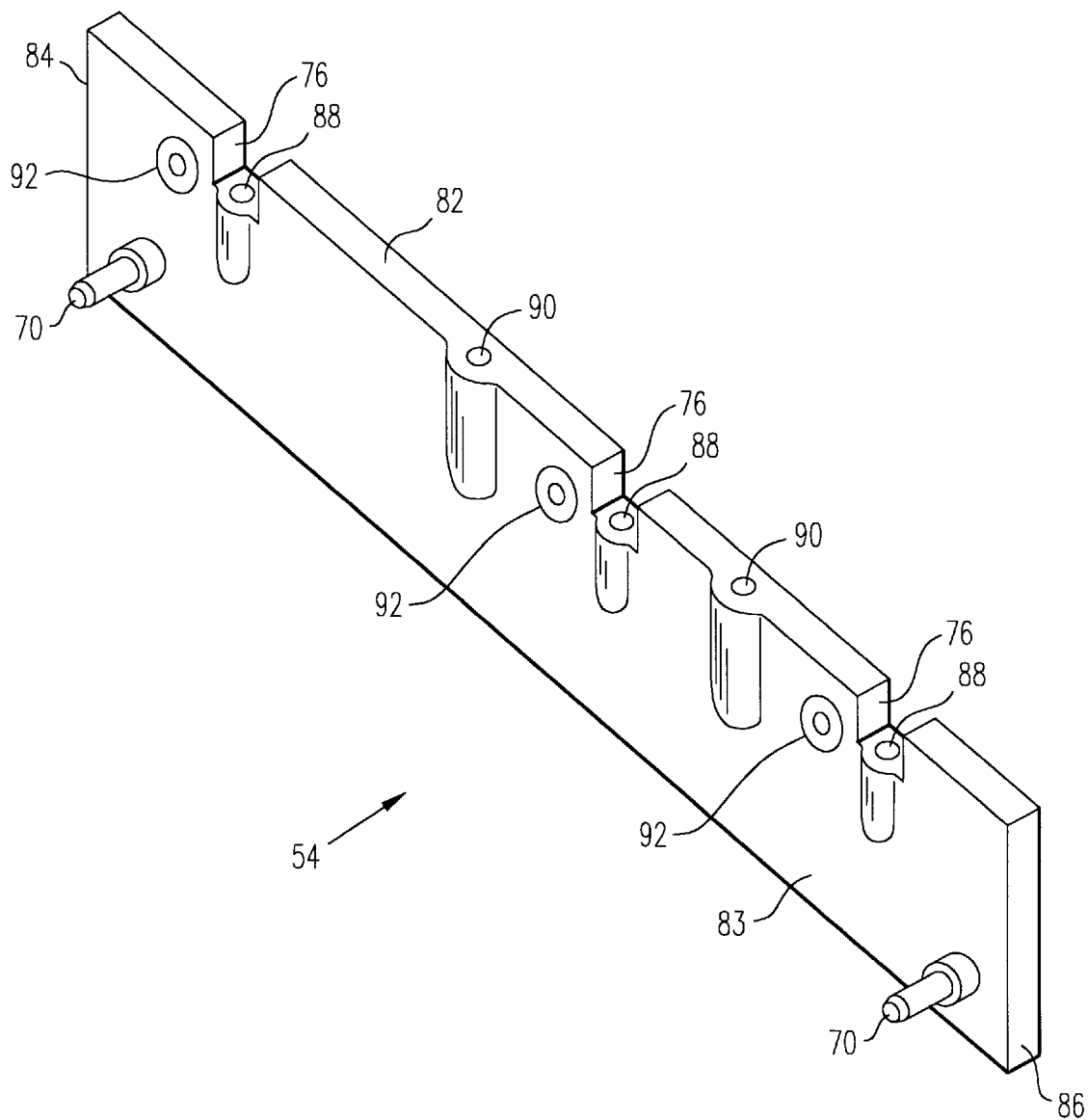
FIG. 5 is an isometric view of a side rail of the diaphragm isolator frame of the present invention showing the inside surface and bottom edge of the side rail.

FIGS. 4 and 5 are isometric views of the side rail 54 illustrating the top edge 80 and the outside surface 81 (surface facing away from the disk drive 10 when assembled) and the bottom edge 82 and the inside surface 83 (surface facing the disk drive 10 when assembled), respectively. In the preferred embodiment, the side rail 54 is made of a plastic material, preferably polycarbonate, and is formed by injection molding processes known to the art. The side rail 54 comprises a substantially rectangularly shaped bar having a front end 84 and a back end 86, an isolator 60 having a thinned circular area diaphragm 61 with a centrally located press-pin 70 near the front end 84, and an isolator 60 having a thinned circular area diaphragm 61 with a centrally located press-pin 70 near the back end 86. The isolators 60 are circular regions of the side rail 54 where the thickness of the rail material is reduced during molding or alternatively by a machining process to form a diaphragm 61. The thickness of the diaphragm 61 of the isolators 60 may be chosen to obtain desired vibration frequency isolation characteristics. At the center of each diaphragm 61, a press-pin 70 is formed during the injection molding process on the inside surface 83 of the side rail 54. The press-pins 70 extend perpendicular to the inside surface 83 to provide a support means for the disk drive 10.

A plurality of slots 76 disposed along the bottom edge 82 of the side rail 54 match a plurality of tabs disposed along the side edge 58 of the circuit board card 52 to provide attachment points for assembly. Threaded metal inserts 88 at the bottom of each slot 76 are molded into the side rail 54 during the injection molding process to allow the use of screws for attachment of the circuit board card 52 to the side rail 54.

Bottom mount inserts 90 comprising threaded metal inserts molded into the bottom edge 82 of the side rail 54 provide bottom attachment points for mounting the assembled diaphragm isolator apparatus 50 into a system rack or other enclosure. Similarly, side mount inserts 92 comprising threaded metal inserts molded into the sides of the side rail 54 provide alternative side attachment points for mounting in a system rack or other enclosure.

The description of the side rail 56 is identical to the above description of side rail 54 except for the necessary geometry changes to allow assembly on the opposite side of circuit board card 52 and support of the opposite side of the disk drive 10.

Figure 6:
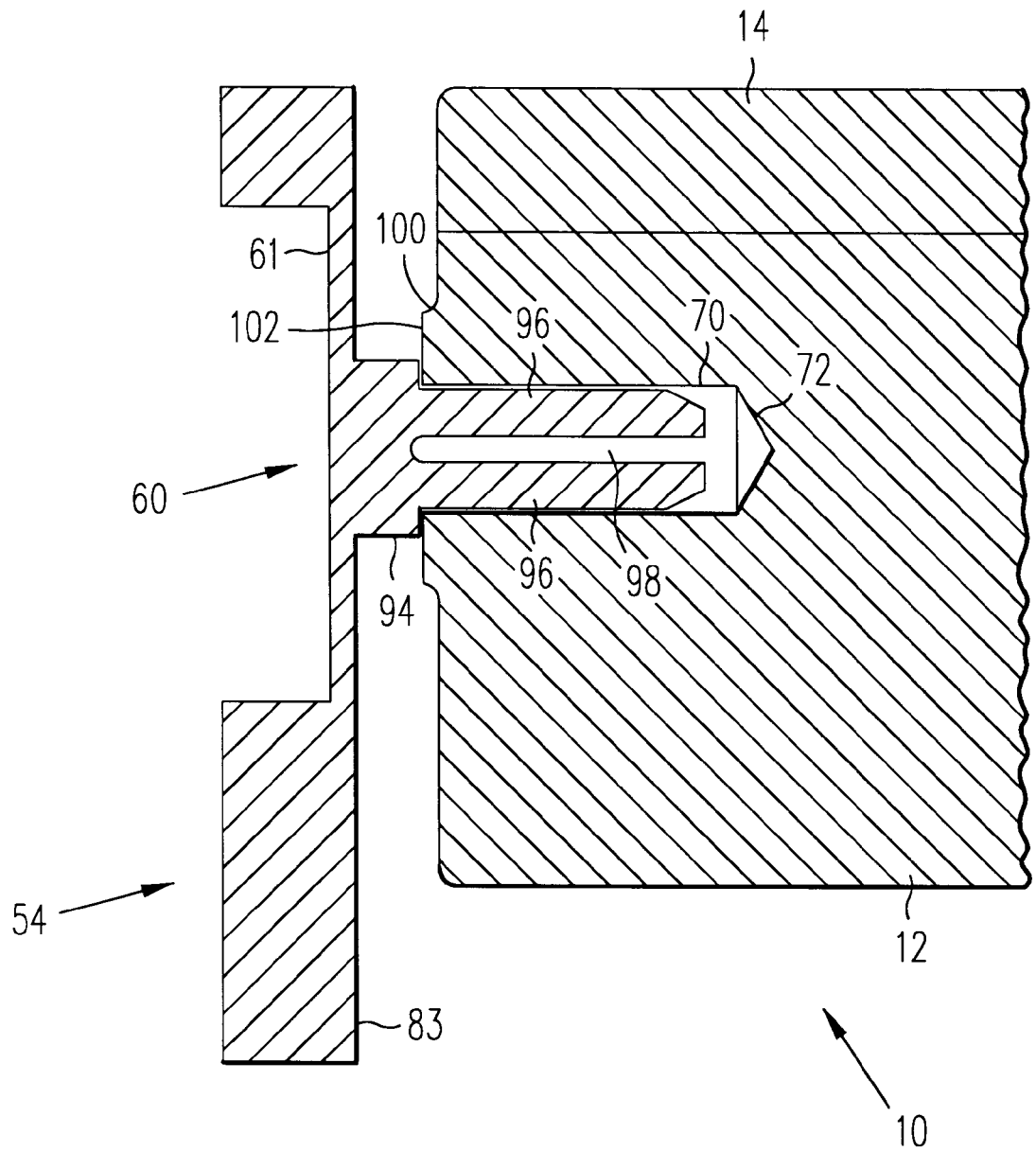
FIG. 6 is a view (not to scale) of section A–A' of the side rail shown in FIG. 4 illustrating detail of the diaphragm isolator and support press-pin of an embodiment of the diaphragm isolator frame of the present invention.

FIG. 6 is a cross-sectional view at section A–A' of the side rail 54 shown in FIG. 4. The section A–A' in FIG. 6 illustrates the detail of the isolator 60 with its thinned diaphragm 61 and centrally located press-pin 70. For better understanding, the press-pin 70 is shown assembled to the housing 12 of the disk drive 10. In the preferred embodiment, the diaphragm 61 of the isolator 60 is a thin circular area of the side rail 54 formed of a plastic material, preferably polycarbonate, by an injection molding process. The diaphragm 61 has a diameter in the range of 10–20 mm, preferably about 15 mm, and a thickness in the range of 0.2–0.6 mm at the inside surface 83 of the side rail 54. At the center of the diaphragm 61, the press-pin 70 is integrally formed on the inside surface 83 by the injection molding process. The press-pin 70 extends perpendicularly from the inside surface 83 and comprises a shoulder 94, a pair of spring pins 96 and a slot 98 disposed between the spring pins 96. The shoulder 94 provides clearance space (sway space) between the inner surface 83 of the side bar 54 and the machined top surface 102 of a boss 100 formed on the housing 12 when the disk drive 10 is assembled in the diaphragm isolator frame 50. The diameter of the shoulder 94 is in the range of 3–6 mm and has a length, defining the sway space, in the range of 1–4 mm. The spring pins 96 are portions of the rod-shaped press-pin 70 separated by the slot 98. The pair of spring pins 96 have a tapered diameter at the distal end of the press-pin 70 for ease of insertion into a receiving hole 72 in the housing 12 during assembly. The slot 98 separating the spring pins 96 provides space for resilient compression of the press-pin 70 to form a close fit to the receiving hole 72. The diameter of the press-pin 70 at the spring pins 96 is in the range of 2–5 mm and the length of the spring pins 96 is in the range of 6–10 mm.

In the best embodiment of the present invention, the four isolators 60 are positioned on the side rails 54 and 56 so that each isolator 60 is equally spaced (equidistant) from the center of gravity of the disk drive 10 when the disk drive is assembled in the diaphragm isolation frame 50. Having the isolators 60 equidistant from the center of gravity of the disk drive 10 ensures that each diaphragm supports an equal fraction of the weight of the disk drive 10. When this condition is met, the vibration isolation characteristics of all four diaphragms 60 can be optimized by using a single isolator design at each position on each side rail. The following process may be used to properly locate the isolators 60 on the side rails 54 and 56: (1) the position of center of gravity of the disk drive 10 is determined by calculation or by measurement, (2) receiving holes 72 are formed on the housing 12, each receiving hole being equidistant from the center of gravity of the disk drive 10, and (3) the side rails 54 and 56 are fabricated with isolators 60 suitably positioned on the side rails to mate with the receiving holes 72 when the disk drive 10 is assembled into the diaphragm isolation frame 50.

The present inventors have carried out experiments to assist in choosing a membrane thickness for the diaphragm isolation frame best suited for absorbing the vibrations caused by a spindle imbalance of the disk stack and actuator-seek related vibrations. To absorb these vibrations, the natural frequency of the absorber must be chosen to be the same as the frequency of the vibrations that are to be eliminated. For typical disk drives, spindle motor vibrations lie in a frequency range from about 60 to 150 Hz depending on the rotation rate of the disk stack.

Figure 7:
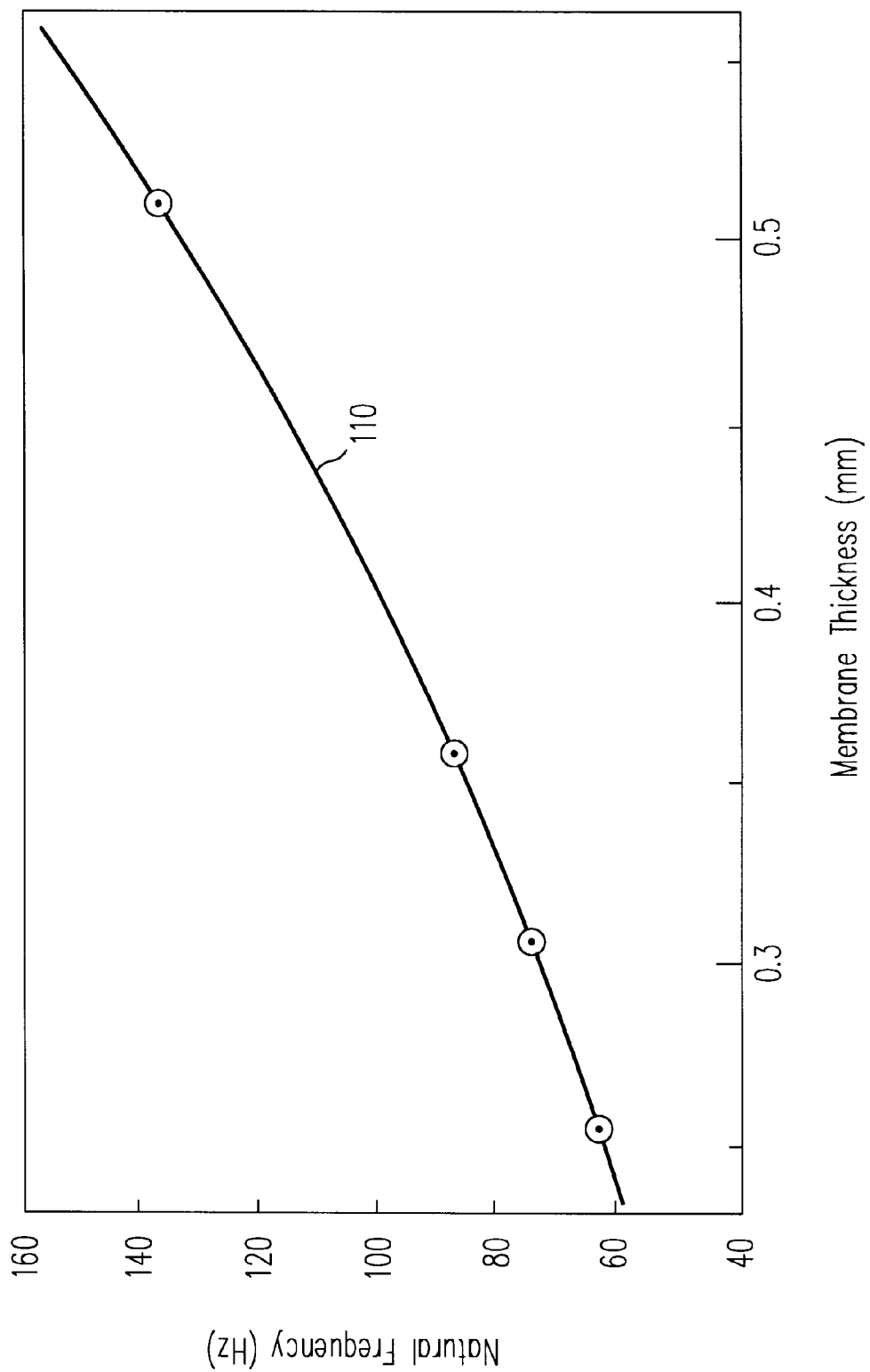
FIG. 7 is a graph of the isolation frequency versus diaphragm thickness for an embodiment of the present invention.

FIG. 7 is a graph of the natural vibration frequency of a disk file mounted in the diaphragm isolation frame 50 of this invention as a function of the thickness of the diaphragms 61 on the side rails 54 and 56. The measurements were made by applying an impulse to the mounted disk drive and recording the natural frequency of vibration of the disk drive using a spectrum analyzer. The disk drive used in these experiments was a 3.5 inch form factor disk drive having a weight of about 580 grams. The side rails 54, 56 and the membranes 61 were made of polycarbonate with the membranes having an outside diameter of about 16 mm and an inside diameter (diameter of shoulder 94) of about 5 mm.

FIG. 7 shows the measured natural vibration frequency of the disk drive mounted in the diaphragm isolation frame for four membrane thicknesses. The natural vibration frequency increased monotonically with increasing membrane thickness (and therefore increasing membrane stiffness). The fitted line 110 may be used to choose the membrane thickness that should be provided on the side rails of the diaphragm isolation frame for isolation at any given frequency. A plot similar to FIG. 7 should be obtained to guide design of the diaphragm isolation frame for disk drives having a different mass and for different materials or dimensions of the side rails and membranes.

While the preferred embodiment of the present invention has been illustrated herein in detail, it will be apparent that modifications and adaptations to this embodiment may occur to those skilled in the art without departing from the spirit, scope and teachings of the present invention as set forth in the following claims.

Accordingly, it is to be understood that the invention disclosed herein is not to be limited by the illustrated embodiment, but only by the scope of the appended claims.

What is claimed is:

1. A side rail providing vibration isolation of a disk drive from an enclosure, comprising:
   a first isolator at a front end of the side rail, said first isolator further comprising a first diaphragm comprising a thinned area of the side rail, and a first press-pin extending perpendicular to an inside surface of the side rail, said first press-pin having a fixed end and a distal free end, the fixed end fixed at the center of said first diaphragm; and
   a second isolator at a back end of the side rail, said second isolator further comprising a second diaphragm comprising a thinned area of the side rail, and a second press-pin extending perpendicular to the inside surface of the side rail, said second press-pin having a fixed end and a distal free end, the fixed end fixed at the center of said second diaphragm.

2. The side rail as recited in claim 1, wherein said side rail is made of plastic.

3. The side rail as recited in claim 1, wherein said side rail is chosen from a group of materials consisting of aluminum and steel.

4. The side rail as recited in claim 1, wherein said side rail is made of polycarbonate.

5. The side rail as recited in claim 4, wherein said first and second diaphragms have a thickness in the range of 0.2 to 0.6 millimeters.

6. The side rail as recited in claim 4, wherein said first and second diaphragms have a diameter in the range of 10 to 20 millimeters.

7. A diaphragm isolator frame for supporting a disk drive while providing vibration isolation, comprising:
   a first side rail having a front end, a back end, an inside surface and an outside surface, said first side rail further comprising a first isolator at the front end of the first side rail, said first isolator comprising a first diaphragm comprising a thinned area of the first side rail, and a first press-pin extending perpendicular to the inside surface of the first side rail, said first press-pin having a fixed end and a distal free end, the fixed end fixed at the center of said first diaphragm, and a second isolator at the back end of the first side rail, said second isolator comprising a second diaphragm comprising a thinned area of the first side rail, and a second press-pin extending perpendicular to the inside surface of the first side rail, said second press-pin having a fixed end and a distal free end, the fixed end fixed at the center of said second diaphragm;
   a second side rail having a front end, a back end, an inside surface and an outside surface, said second rail further comprising a first isolator at the front end of the second side rail said first isolator further comprising a second diaphragm including a thinned area of the second side rail, and a first press-pin extending perpendicular to the inside surface of the second side rail, said first press-pin having a fixed end and a distal free end, the fixed end fixed at the center of said first diaphragm, and a second isolator at the back end of the second side rail, said second isolator further comprising a second diaphragm comprising a thinned area of the second side rail, and a second press-pin extending perpendicular to the inside surface of the second side rail, said second press-pin having a fixed end and a distal free end, the fixed end fixed at the center of said second diaphragm; and
   a circuit board card disposed between said first side rail and said second side rail, said circuit board card having parallel first and second edges wherein the first side rail is fixed along the first edge and the second side rail is fixed along the second edge.

8. The diaphragm isolator frame as recited in claim 7, wherein said first and second side rails are made of plastic.

9. The diaphragm isolator frame as recited in claim 7, wherein said first and second side rails are chosen from a group of materials consisting of aluminum and steel.

10. The diaphragm isolator frame as recited in claim 7, wherein said first and second side rails are made of polycarbonate.

11. The diaphragm isolator frame as recited in claim 10, wherein said diaphragms have a thickness in the range of 0.2 to 0.6 millimeters.

12. The diaphragm isolator frame as recited in claim 10, wherein said diaphragms have a diameter in the range of 10 to 20 millimeters.

13. A method for supporting a disk drive in a diaphragm isolator frame, wherein each of a plurality of isolators support an equal fraction of the weight of the disk drive, comprising the steps of:
   determining the position of the center of gravity of the disk drive;
   forming a plurality of receiving holes, for receiving supporting press-pins on the plurality of isolators, on a housing of the disk drive equidistant from the center of gravity of the disk drive;
   fabricating the side rails of the diaphragm isolator frame with the isolators positioned to mate with the receiving holes on the housing of the disk drive when the disk drive is mounted in the diaphragm isolator frame; and
   assembling the diaphragm assembly frame to support the disk drive.

* * * * *